(12) United States Patent
Milenova et al.

(10) Patent No.: US 9,208,257 B2
(45) Date of Patent: Dec. 8, 2015

(54) PARTITIONING A GRAPH BY ITERATIVELY EXCLUDING EDGES

(71) Applicant: Oracle International Corporation, Redwood Shores, CA (US)

(72) Inventors: Boriana Lubomirova Milenova, Reading, MA (US); Marcos M Campos, La Jolla, CA (US)

(73) Assignee: Oracle International Corporation, Redwood Shores, CA (US)

( * ) Notice: Subject to any disclaimer, the term of this patent is extended or adjusted under 35 U.S.C. 154(b) by 84 days.

(21) Appl. No.: 13/832,806

(22) Filed: Mar. 15, 2013

(65) Prior Publication Data

US 2014/0280143 A1  Sep. 18, 2014

(51) Int. Cl.
*G06F 17/30* (2006.01)
(52) U.S. Cl.
CPC .... *G06F 17/30958* (2013.01); *G06F 17/30598* (2013.01); *G06F 17/30705* (2013.01)
(58) Field of Classification Search
CPC .............. G06F 17/30705; G06F 17/30; G06F 17/30277; G06F 9/4843; G06F 17/30595; G06F 17/50; G06F 19/701; G06F 2217/16; G06F 17/30536; G06F 17/30687; G06F 19/321; G06F 19/345; G06F 19/12; G06F 8/34; G06F 9/4428; G06F 17/30598; G06F 8/70; G06N 5/003; G06Q 10/103; G06Q 10/08355
USPC ......... 707/737, 769, 812, 798, 722, 728, 797, 707/748, 803, 770, 741, 802, E17.044; 709/223; 715/771; 718/103, 102; 705/7.11, 301, 338
See application file for complete search history.

(56) References Cited

U.S. PATENT DOCUMENTS

| | | | | |
|---|---|---|---|---|
| 7,249,341 | B2 * | 7/2007 | Riedel et al. | 716/104 |
| 8,521,782 | B2 * | 8/2013 | Gong et al. | 707/791 |
| 8,560,605 | B1 * | 10/2013 | Gyongyi | 709/204 |
| 8,645,339 | B2 * | 2/2014 | Kang et al. | 707/693 |

(Continued)

OTHER PUBLICATIONS

David Ginat CS Group, Science Education Department, Tel-Aviv University, Israel—"Metacognitive awareness utilized for learning control elements in algorithmic problem solving"—Proceeding ITiCSE '01 Proceedings of the 6th annual conference on Innovation and technology in computer science education; vol. 33 Issue 3, Sep. 2001 pp. 81-88.*

(Continued)

*Primary Examiner* — Anh Ly
(74) *Attorney, Agent, or Firm* — Hickman Palermo Becker Bingham LLP (57) ABSTRACT

Methods, machines, and stored instructions are provided for partitioning a graph of nodes into clusters of nodes by iteratively excluding edges in the graph. For each node of at least a subset of nodes in the graph, a graph partitioning module determines whether to exclude edges for the node and, if so, selects for exclusion edge(s) to at least a subset of the node's neighbor(s). The module selects edge(s) to the node's neighbor(s) for exclusion based at least in part on a degree of overlap between the node's neighbor(s) and neighbor(s) of the node's neighbor(s). For any subset(s) that are yet not sufficiently partitioned into clusters, the module repeats the step of determining whether to exclude edges and, if so, selecting nodes for exclusion, and determining whether or not the nodes are sufficiently partitioned. Subset(s) of nodes that are already sufficiently partitioned may be skipped during the repeated steps.

32 Claims, 5 Drawing Sheets

(56) References Cited

U.S. PATENT DOCUMENTS

| | | | |
|---|---|---|---|
| 2003/0154189 A1* | 8/2003 | Egilsson et al. | 707/1 |
| 2004/0183799 A1* | 9/2004 | Hao et al. | 345/440 |
| 2006/0036372 A1* | 2/2006 | Yener et al. | 702/19 |
| 2006/0271564 A1* | 11/2006 | Meng Muntz et al. | 707/100 |
| 2008/0033897 A1* | 2/2008 | Lloyd | 706/19 |
| 2009/0313596 A1* | 12/2009 | Lippmann et al. | 716/12 |
| 2010/0111396 A1* | 5/2010 | Boucheron | 382/133 |
| 2010/0149186 A1* | 6/2010 | Gansner et al. | 345/440 |
| 2010/0174732 A1* | 7/2010 | Levy et al. | 707/768 |
| 2012/0051589 A1* | 3/2012 | Schloegel et al. | 382/103 |
| 2012/0229445 A1* | 9/2012 | Jenkins | 345/418 |
| 2012/0259850 A1* | 10/2012 | Liu et al. | 707/737 |
| 2013/0024479 A1* | 1/2013 | Gong et al. | 707/798 |
| 2013/0046797 A1* | 2/2013 | Muntz et al. | 707/803 |
| 2013/0124488 A1* | 5/2013 | Kang et al. | 707/693 |
| 2013/0143329 A1* | 6/2013 | Holmquist et al. | 436/131 |
| 2013/0246480 A1* | 9/2013 | Lemcke et al. | 707/797 |
| 2014/0067808 A1* | 3/2014 | Narang et al. | 707/737 |
| 2014/0143329 A1* | 5/2014 | Garg et al. | 709/204 |

OTHER PUBLICATIONS de Lima, N.F. and Ludermir, T.B.—"Frankenstein PSO applied to neural network weights and architectures"—Published in: Evolutionary Computation (CEC), 2011 IEEE Congress on; Date of Conference: Jun. 5-8, 2011—pp. 2452-2456.* de Lima, N. F. and Ludermir, T.B.—"Frankenstein PSO applied to neural network weights and architectures" —Published in: Evolutionary Computation (CEC), 2011 IEEE Congress on; Date of Conference: Jun. 5-8, 2011—pp. 2452-2456.*

David Ginat CS Group, Science Education Department, Tel-Aviv University, Israel—"Metacognitive awareness utilized for learning control elements in algorithmic problem solving" —Proceeding ITiCSE '01 Proceedings of the 6th annual conference on Innovation and technology in computer science education; vol. 33 Issue 3, Sep. 2001 pp. 81-84.*

Graphic Clustering, Satu Elisa Schaeffer; 38 pages; Computersciencereview 1 (2007).

Local Graph Sparsification for Scalable Clustering: Venu Satuluri, Srinivasan Parthasarathy and Yiye Ruan; Dept. of Compter Science and Engineering The Ohio State University; 12 pages.

Jaccard Index—Wikipedia, the free encyclopedia; 4 pages.

\* cited by examiner

FIG. 2A: PORTION OF INITIAL GRAPH OF NODES

FIG. 2B: PORTION OF GRAPH AFTER ONE ITERATION

FIG. 2C: PORTION OF GRAPH AFTER TWO ITERATIONS

PARTITIONING A GRAPH BY ITERATIVELY EXCLUDING EDGES

TECHNICAL FIELD

The technical field relates to partitioning a graph of nodes into clusters of nodes.

BACKGROUND

Most businesses now rely on efficient and accurate storage, retrieval, processing, and analysis of datasets. These datasets represent information about customers, business opportunities, business risks, liabilities, transactions, employees, locations, phone calls, emails, text messages, social networks, or any other information about person(s), place(s), thing(s), or event(s) of concern to the business.

Datasets may be represented in a graph as items or nodes of information. Some of these nodes may be related to other nodes, and these relationships between nodes may be represented as connections or edges between the related nodes. Datasets that are represented by graphs may be stored in any data structure, including but not limited to tables, arrays, linked lists, feature vectors, trees or other hierarchies, matrices, structured or unstructured documents, or other data objects.

An example dataset may be a log of phone calls or email addresses over a given period of time, and the dataset may be represented in a graph as nodes of phone numbers or email addresses that are connected via graph edges to each other. For phone companies with millions of customers, the number of nodes and edges in this graph may be massive. Similarly, logs of posts or messages between friends in social networks may be represented in a graph as nodes of contacts that are connected via graph edges to each other. For large social networks, the number of nodes and edges in this graph may be massive.

Although simple datasets having few items may be visualized and readily understood by human analysts, complex datasets having many items often require processing and computational analysis before such datasets are meaningful to human analysts or even to many software applications. Clustering techniques may simplify complex datasets into clusters to support analysis of the datasets. Clusters are subsets of nodes in the graph that are related to each other. In some examples, a cluster is a network of nodes that are connected to each other, directly or indirectly, by edges. Many clustering techniques attempt to evaluate entire datasets to find optimal partitions based on global criteria without the ability to break up this evaluation into smaller manageable operations. Such techniques may consider all edges and all nodes in a graph before making any clustering determinations and, accordingly, may provide excellent results for small datasets. However, such techniques are not practical for massive datasets, such as for datasets where the number of desired clusters is in the millions, due to the computational and storage requirements for evaluating entire datasets to find partitions based on global criteria. Such techniques scale poorly for massive datasets because the computational and storage requirements to implement the techniques are highly dependent on the sizes of the datasets.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for partitioning a graph of nodes into clusters of nodes by iteratively excluding edges. In one embodiment, a graph partitioning module, comprising special-purpose hardware and/or special-purpose software operating on computing device(s), partitions a graph into clusters by iteratively excluding edges from nodes in the graph. For each node of at least a subset of nodes in the graph, the graph partitioning module determines whether to exclude edges for the node and, if so, selects for exclusion or removal edge(s) to at least a subset of other node(s) that were previously connected to the node (i.e., at least a subset of the node's neighbor(s)). Such a selection may be made directly or by first selecting the edge(s) to keep and then marking the remaining edge(s) for exclusion. The graph partitioning module selects edge(s) to the node's neighbor(s) for exclusion based at least in part on a degree of overlap between the node's neighbor(s) themselves and neighbor(s) of the neighbor(s). For example, the graph partitioning module may keep an edge to a neighbor that shares many neighbors with the node, and the graph partitioning module may mark for exclusion another edge to another node that does not share many neighbors with the node.

After edges have been excluded, the graph partitioning module then determines whether or not subset(s) of the graph nodes are sufficiently partitioned into cluster(s). For any subset(s) that are yet not sufficiently partitioned into clusters, the graph partitioning module may repeat the step of determining whether to exclude edges and, if so, selecting edges for exclusion optionally followed by a repeated step of determining whether or not the nodes are sufficiently partitioned. Any subset(s) of nodes that are already sufficiently partitioned may be marked as complete and skipped or excluded from evaluation during the repeated steps. The steps of determining whether to exclude edges and, if so, selecting edges for exclusion, and determining whether or not subset(s) of the nodes have been sufficiently partitioned may be repeated in multiple iterations until a maximum number of iterations would be exceeded or until all subsets of nodes are sufficiently partitioned, either of which could stop repetition of the steps.

In one embodiment, edges of a graph are marked for removal or exclusion by updating a stored data structure that represents the graph. The edges may be either removed from the data structure altogether or marked or flagged with a stored indication that the edges should be no longer considered part of a simplified graph. When the graph is accessed by the graph partitioning module, edges that have already been excluded may be skipped during edge removal steps.

Nodes of a graph may be marked as completed by updating a stored data structure that represents the graph. Some nodes may be marked as completed before any edge removal. Such nodes may be excluded from the sparsification process altogether before edge removal, in which case edges of the node are retained and are not subjected to edge removal. In this way, marked nodes may be skipped during edge removal steps. Nodes may also be marked as completed when the nodes are part of a satisfactory cluster after edge removal. Nodes that are marked as completed may have been initially subjected to edge removal iteration(s) but may be skipped or excluded from evaluation during further edge removal iteration(s) after the nodes are marked as completed. The graph partitioning module may access an indication stored in association with a node and skip over the node if the node belongs to a completed set or cluster of nodes during edge removal iteration(s). In another embodiment, the graph partitioning module may retain a list of non-completed nodes for further evaluation, and nodes may be removed from this list as the nodes become part of a satisfactory cluster.

The graph partitioning module may partition nodes by removing edges on a node-by-node basis for the entire graph and iteratively repeat the process of edge removal until the graph is partitioned into clusters that meet size and separateness requirements. The process of removing edges from the graph is called "sparsification," and higher levels of sparsification, if applied, would remove a higher percentage of edges from the graph for nodes having certain numbers of edges than would lower levels of sparsification for nodes having the same numbers of edges. The clusters are generated by iteratively sparsifying the graph and marking, as complete, nodes in sufficiently defined clusters—the graph partitioning process does not require a clustering algorithm to be performed on top of the clusters that result from the iterative sparsification. In one embodiment, sparsification does not remove any nodes from the graph—only edges between nodes. For example, the clusters may meet size requirements if they include fewer than 50 nodes and may meet separateness requirements if the entire cluster is disconnected from other nodes in the graph. Because the graph is processed on a node-by-node basis, the graph partitioning module does not need to concurrently load information about all of the nodes or edges in the graph at once to make any edge removal determinations. Instead, for each node, the graph partitioning module only considers information about that node, the neighbors of that node, and the neighbors of those neighbors. In this way, the evaluation is localized for each node and is scalable for massive numbers of nodes.

After the graph is processed on a node-by-node basis in an edge removal iteration, the graph partitioning module performs connected component discovery to determine whether any of the remaining nodes are sufficiently partitioned into clusters. Partitions or clusters may be discovered by crawling away from selected nodes until all edges have been followed, and starting the crawl process again for newly selected nodes in the graph that have not yet been crawled. Nodes that have been crawled may be marked as belonging to a given partition, and new nodes may be selected from among unmarked nodes. The crawling process may be repeated iteratively until all nodes in the graph belong to a partition, and the partition discovery process may be repeated iteratively after the edge removal process until either all clusters are sufficiently sized or until a maximum number of edge removal and partition discovery iterations have been performed.

For example, for each node that has not yet been selected during the partition discovery process, the partition discovery process iteratively crawls away from an initial node based on the edges of the node. For each next node reached while crawling away from the initial node, the partition discovery process may repeat the iterative crawling process for all of the neighbors of the next node until either the entire graph has been crawled or there are no more edges connected, directly or indirectly, to the initial node. Then, the partition discovery process may repeat for new initial nodes until all nodes have been crawled. Crawled nodes belong to networks, clusters, or partitions that include initial nodes, which may have been chosen randomly. The partitions may then each be separately considered for whether they satisfy criteria, and nodes that are part of partitions that satisfy the criteria may be marked as completed. Because the partition discovery process may be completed on a node-by-node basis for unmarked nodes, the graph partitioning module does not need to concurrently load information about all of the nodes or edges in the graph at once to make any determinations about cluster membership.

Figure 1:
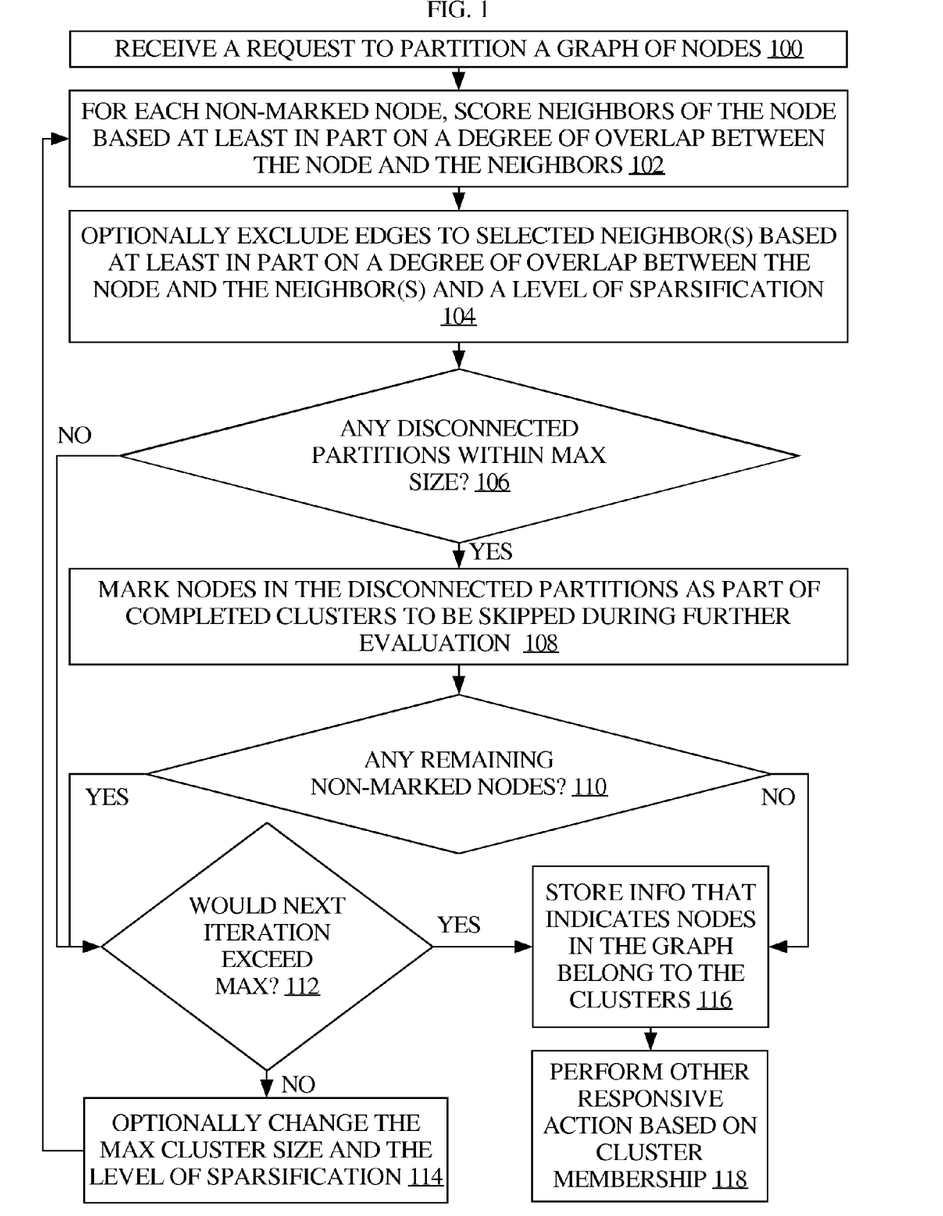
FIG. 1 illustrates an example process for partitioning a graph by excluding edges.

FIG. 1 illustrates an example process for partitioning a graph by excluding edges. A graph partitioning module operating on computing device(s) receives a request to partition a graph of nodes in step 100. In response to the request, the graph partitioning module scores, in step 102 for each non-marked node in the graph (initially there may be zero nodes that are marked as complete), neighbors of the node based at least in part on a degree of overlap between the node and the neighbors. In step 104, the graph partitioning module may optionally exclude edges to selected neighbor(s) based at least in part on a degree of overlap between the node and the neighbor(s) and a level of sparsification. The graph partitioning module may elect not to exclude edges for a given node if the graph partition module determines to keep a number of edges that is greater than or equal to the number of edges or connections to the given node (referred to as the "degree" of the node). In step 106, a determination is made as to whether, after excluding the edges in step 104, there are any disconnected partitions within a maximum cluster size. Step 106 may include determining all separate sets of connected components among the non-marked nodes in the graph. These separate sets of connected components may be disconnected or partitioned from each other. If there are disconnected partitions within the maximum cluster size, the nodes in the disconnected partitions are marked as completed clusters in step 108, which are skipped during further iterations of steps 102-106. If there are no clusters within the maximum cluster size, the graph partitioning module may continue with another iteration of partitioning (steps 102-106) as long as the next iteration does not exceed the maximum number of iterations, as determined in step 112. The maximum cluster size and level of sparsification may be modified before the next iteration in step 114.

After nodes are marked as completed in step 108, the process reaches step 110 where the graph partitioning module determines whether the graph has any remaining nodes that have not yet been marked as completed (as performed in iteration(s) of step 108) as a result of being part of satisfactory clusters (as determined in iteration(s) of step 106). If there are still nodes that are not yet part of satisfactory clusters, then the process continues with another iteration of partitioning (steps 102-106) while skipping during evaluation the nodes that were already marked as completed in iteration(s) of step 108. The graph partitioning module may avoid further iterations in step 112 if the next iteration would exceed a maximum number of iterations, and the graph partitioning module may adjust the maximum cluster size and/or level of sparsification in step 114.

Upon either determining that there are not any remaining non-marked nodes in step 110 or determining that the next iteration would exceed a maximum number of iterations in step 112, the graph partitioning module may store a result of the graph partitioning process in step 116. As shown, the graph partitioning module stores information that indicates nodes in the graph belong to clusters. If the graph partitioning iterations end at step 112, the stored information may also indicate that any remaining non-marked nodes belong to a same cluster. Alternatively, the remaining non-marked nodes may be subjected to a separate clustering algorithm that splits up the remaining non-marked nodes into clusters. In step 118, the graph partitioning unit or another application may perform other responsive action based on the cluster membership. For example, an application may make predictions for nodes in the dataset based on the cluster membership of the nodes.

Figure 2A:
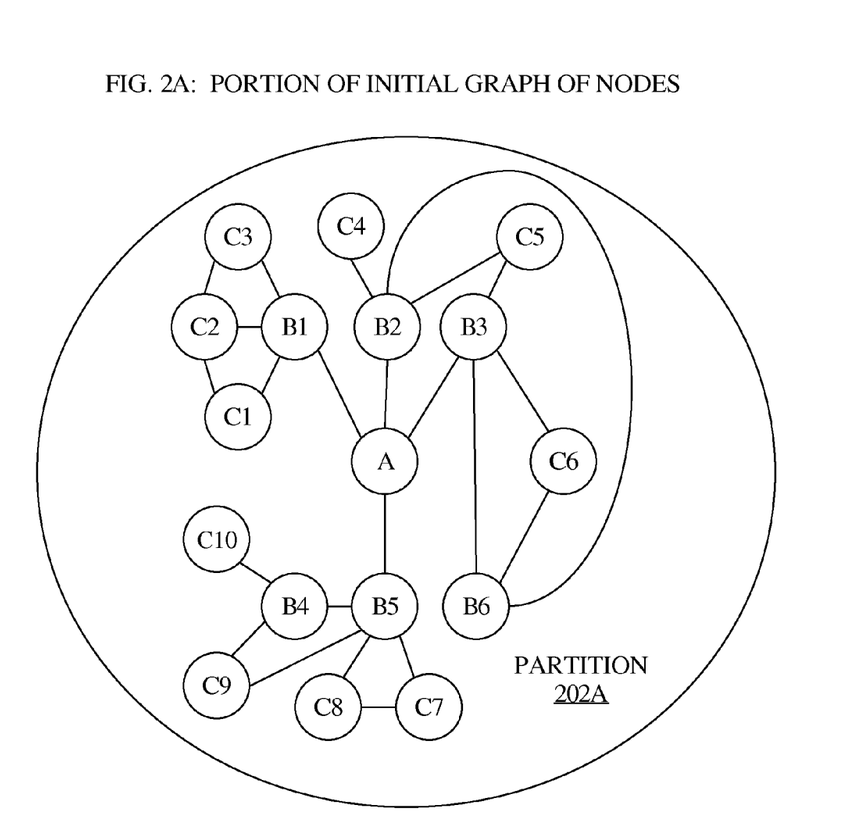
FIG. 2A illustrates an example portion of an initial graph of nodes.

FIG. 2A illustrates an example portion of an initial graph of nodes before the graph is partitioned into clusters. This graph has been simplified for illustration. In reality, sample complex graphs have millions or billions of nodes and billions or trillions of edges. The example graph is represented as one partition 202A because none of the nodes are disconnected from the other nodes. As shown, node A is connected to 6 neighbors, B1-B6, and these nodes are connected to their neighbors. Some of A's neighbors are also connected to each other. For example, B2 and B3 are connected to B6, and B4 is connected to B5. In the example, edges may be removed from the example portion of the initial graph in FIG. 2A if partition 202A is not a satisfactory cluster. In other words, partition 202A may contain too many nodes or may be connected to other nodes (not shown) in the graph.

Figure 2B:
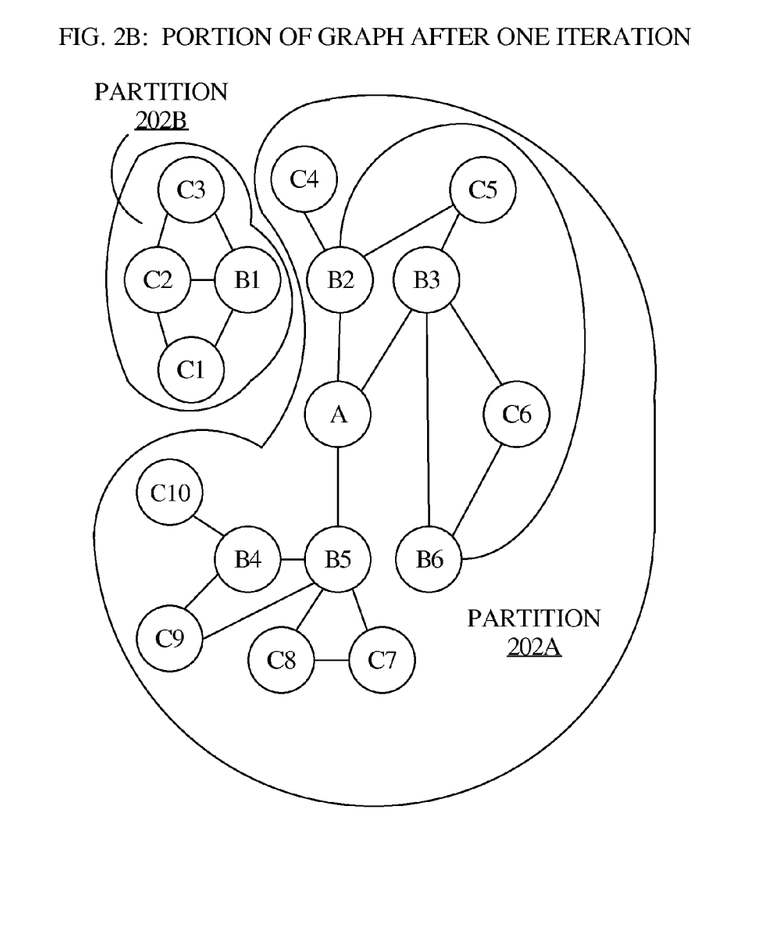
FIG. 2B illustrates the example graph portion of FIG. 2A after one example iteration of removing edges.

FIG. 2B illustrates the example graph portion of FIG. 2A after one example iteration of removing edges (i.e., after the "first sparsification iteration"). In the simplified example, the edge between node A and B1 may have been removed upon determining that B1 has the fewest neighbors in common (zero) with A. All of A's other neighbors have at least one neighbor in common with A. As a result of removing the edge between node A and B1 in the sparsification iteration, partition 202B is formed as a separate partition from partition 202A. In the example, none of the illustrated edges between any of the other nodes have been removed during the first sparsification iteration. However, edges may have also been removed from these nodes if these nodes were not initially skipped during evaluation for the first sparsification iteration. In one example, non-illustrated edges between the illustrated nodes and other nodes, and non-illustrated edges among the illustrated nodes may have been removed during the first sparsification iteration.

Figure 2C:
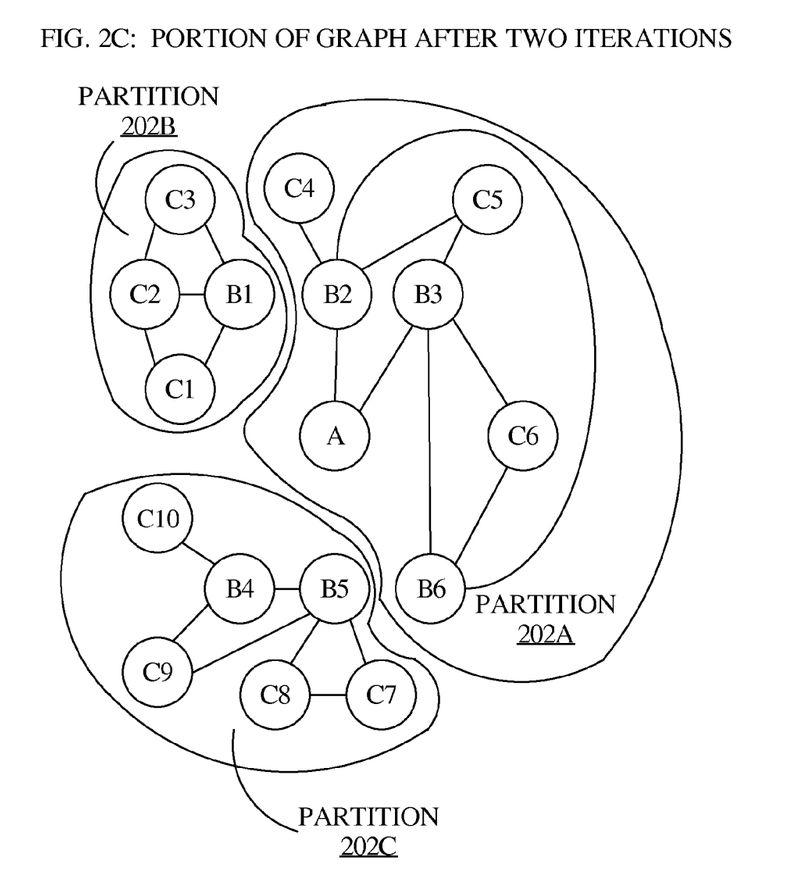
FIG. 2C illustrates the example graph portion of FIG. 2A after two example iterations of removing edges.

FIG. 2C illustrates the example graph portion of FIG. 2A after two example iterations of removing edges. In the example, the edges between nodes A and B4 and A and B5 have been removed during the second sparsification iteration. The edges may have been removed as a result of determining that nodes B2, B3, and B6 have more neighbors in common with node A than do nodes B4 and B5. Removal of the edges in the second sparsification iteration forms partition 202C as a separate partition from partition 202A. In the example, none of the illustrated edges between any of the other nodes have been removed during the second sparsification iteration. However, edges may have also been removed from these nodes if these nodes were not skipped during evaluation for the second sparsification iteration. In one example, non-illustrated edges between the illustrated nodes and other nodes, and non-illustrated edges among the illustrated nodes may have been removed during the first sparsification iteration.

After the second sparsification iteration, the graph partitioning module may determine that the example sparsified graph portion of FIG. 2C is sufficiently partitioned. In other words, the graph partitioning module may determine that the three partitions are sufficiently small enough and are sufficiently disconnected from other nodes in the graph.

The techniques described herein may be implemented as specially configured computer system(s), particular method(s) implemented by the computer system(s), and/or particular instruction(s) stored on non-transitory or physical electronic storage media/medium for implementation by the computer system(s). For example, the computer systems may include a combination of stored instructions of a particular type and hardware configured to execute instructions of the particular type such that the stored instructions, when executed by the hardware, cause performance of the particular methods. Many of the techniques described herein, due to their complex and technical nature, can only be performed by machine(s), regardless of whether such machine(s) are mentioned with regard to the steps performed by those machine(s).

Determining Whether Subsets of Nodes are Sufficiently Partitioned

The graph partitioning module may determine whether or not subset(s) of nodes are sufficiently partitioned based on whether or not or how much those subset(s) are connected to nodes that are outside of the subset(s), and/or based on how many nodes are in the subset(s). In one embodiment, after the partitioning process is complete, all or a subset of nodes in the graph may belong to a cluster of one or more nodes, and many of the clusters may have several nodes. For example, a subset of 15 nodes may be considered to be sufficiently clustered if the 15 nodes connected together, directly or indirectly via internal edges within the cluster, are completely disconnected from all other nodes in the graph, and/or if the number of nodes (15) is less than a maximum cluster size. The graph partitioning module may increase the maximum cluster size iteration by iteration as the iterations progress such that a separated cluster of 30 nodes may be too large to be considered sufficiently clustered after a first iteration, but a cluster of the same size may be determined to be sufficiently clustered after a second iteration.

In one embodiment, the graph partitioning module may consider a cluster to be sufficiently partitioned if the cluster is partially disconnected even if the cluster has connection(s) or "external edges" to nodes outside of the cluster. The graph partitioning module may allow for a maximum number of connections to outside nodes for a cluster that is considered to be sufficiently partitioned, and this maximum number of connections may be increased iteration by iteration as the iterations progress.

Alternatively, the graph partitioning module may stop crawling away from initial nodes during the partition discovery phase when the next level of crawling away from the initial nodes has fewer than a threshold number of edges. For example, a cluster that includes an initial node may be defined when, after exploring neighbors of neighbors of neighbors of the initial node (i.e., after three levels of crawling), there is only one or a few edges that are both available to follow and have not yet been explored. The resulting cluster may be defined based on the nodes that were reached by the crawling but not by the nodes that were unreached by the crawling. This resulting cluster may be determined to be within a threshold size even though crawling a next edge away from the initial node may have opened up hundreds or thousands of more edges for crawling.

Determining how Many Edges to Keep or Remove

In one embodiment, the graph partitioning module determines, for each node, how many edges, if any, are selected for exclusion based at least in part on a total number of edges of said each node, or the node's "degree." For example, nodes initially having many neighbors, which are referred to as "nodes of high degree," may be allowed to keep more edges than nodes that do not initially have many neighbors ("nodes of low degree"). Conversely, because nodes of high degree have more edges to evaluate than do nodes of low degree, more edges may be excluded from nodes of high degree even though the nodes of high degree are also allowed to keep more edges than nodes of low degree. In a simple example, 60 edges may be excluded from a node of high degree initially having 100 neighbors, and 5 edges may be excluded from a node of low degree initially having 10 neighbors. More edges were excluded (60 versus 5) from the node of high degree, but the node of high degree also kept more edges (40 versus 5) after the exclusion. In the example, the determination of how many nodes to keep for a given node varied based on the number of edges between the given node and other nodes (40% for the node of high degree and 50% for the node of low degree). In other examples, the determination may be a flat percentage for all nodes, may vary based on additional factors, or may vary to a greater degree based on the degree of the node.

The graph partitioning module may apply different levels of sparsification in different iterations to determine how many edges, if any, are to be selected for exclusion. Applying higher levels of sparsification may cause a higher portion or percentage of edges to be selected for exclusion for nodes with same degrees, and applying lower levels of sparsification may cause a lower portion or percentage of edges to be selected for exclusion for nodes with same degrees. Applying a higher level of sparsification after a lower level of sparsification may cause exclusion of additional edges that were not excluded by the lower level of sparsification.

The level of sparsification may be controlled by parameters to a sparsification function. An example sparsification function that can be used to determine how many edges to keep for a given node is $f(d,x)=d^x$, where d is the degree (in terms of the number of neighbors) of the node and x is a variable between 0 and 1 that controls the level of sparsification. Another example is $f(d,x)=d*\log(x)$ for x between 0 and 10. In the first example, lower values of x may result in keeping fewer edges for a higher level of sparsification, and higher values of x may result in keeping more edges for a lower level of sparsification. In the second example, higher values of x may result in keeping fewer edges for a higher level of sparsification, and lower values of x may result in keeping more edges for a lower level of sparsification. The variable, x, may be adjusted for each iteration but may apply to all nodes evaluated during that iteration. In other words, the same sparsification function may be applied to all of the remaining non-marked nodes in a given sparsification iteration. The parameter, d, is node-specific and may vary node by node. Other example sparsification functions include $f(d,x)=dx$ for x between 0 and 1, or just $f(x)=x$ if $d>x$. Any function of d and/or x may be chosen to define the level of sparsification.

The sparsification function may also define how many edges should be removed for a given node. In the first two examples above, $f(d,x)=d-d^x$ or $f(d,x)=d(1-\log(x))$ may specify how many edges should be removed from the node. A first function of how many edges should be kept may be converted into a second function of how many edges should be removed by subtracting a result of the first function from d, the degree of the given node.

In one embodiment, x is modified to adjust the level of sparsification by dividing or multiplying x by 2 or some other number. In another embodiment, x is modified by squaring or taking the square root of x, or by raising x to some other exponential power.

Determining the Degree of Overlap

In one embodiment, the graph partitioning modules determines a Jaccard Distance that defines a degree of overlap between two nodes, A and B. The Jaccard Distance, $J(A_n, B_n)$, for $A_n$ neighbors of node A and $B_n$ neighbors of node B, is $1-(A_n \cap B_n)/(A_n \cup B_n)$, where the Jaccard Index is defined as $(A_n \cap B_n)/(A_n \cup B_n)$. In other words, The Jaccard Index is the number of shared neighbors of A and B ($A_n \cap B_n$) divided by the total number neighbors of either A or B ($A_n \cup B_n$). For small sets of neighbors, $A_n$ and $B_n$, the Jaccard Distance may be easily computed by counting the number of neighbors that overlap between $A_n$ and $B_n$.

For larger sets of neighbors, the Jaccard Distance may be approximated by comparing a single randomly chosen neighbor of A to a single randomly chosen neighbor of B, where the neighbors of A and B are randomly chosen in the same manner. Using this approximation, the value of the randomly chosen neighbors will match if A and B share the same neighbors, will likely match if A and B mostly share the same neighbors, and will not likely match if A and B do not mostly share the same neighbors. The process of comparing random neighbors between A and B may be repeated multiple times, choosing random neighbors in different ways each time, but few enough times that the process is still generally more efficient and/or having a more predictable computational expense than computing the Jaccard Index. In one embodiment, this process is repeated 30 times. In another embodiment, the process is repeated 5 times.

In one embodiment, instead of comparing long lists of neighbors with each other (as may be done in a Jaccard Index computation), the graph partitioning module may determine and compare a min-hash signature or other hash signature for each given node to signatures of the given node's neighbors. For each of the nodes for which a signature is created, the signature may comprise hash value(s) that are selected from set(s) of hash values that are computed from the set of neighbors of the node. In one example, for each of the nodes for which a signature is created, multiple sets of hash values are computed using different hash functions, and one hash value is selected from each of the multiple sets computed using different hash functions. The signatures may then be compared with the assumption that more closely matching signatures likely reflect nodes that have more closely matched sets of neighbors. The signatures may be smaller or more compressed than the entire lists of neighbors, and may be compared more quickly or efficiently than the entire lists of neighbors.

In one embodiment, the randomly selected neighbors of two sets of nodes are chosen by hashing the two sets of nodes using a hash function and selecting a value in a particular position within each of the two sets. In other words, the graph partitioning module may determine, for each node, a degree of overlap between neighbor(s) of the node and neighbor(s) of the neighbor(s) at least in part by hashing identifiers of neighbor(s) of the node into a set of hash value(s) and hashing identifiers of neighbor(s) of the neighbor(s) into other set(s) of hash value(s). For each of the other set(s) of hash value(s), the graph partitioning module may determine whether a first selected hash value of the set matches a second selected hash value of the other set. The selected value may be the minimum hash value in each set, the maximum hash value in each set, or some other hash value from each set that is selected for comparison. If the values match for a respective neighbor, the graph partitioning module may determine that the node and the neighbor have a high degree of overlap.

Alternatively, the graph partitioning module may generate a score for each neighbor that is based at least in part on whether the selected hash values matched for that neighbor. If a score is used, the graph partitioning module may hash the identifiers for neighbor(s) of the node and for the neighbor(s) of the neighbor(s) using multiple different hash functions that cause generation of multiple different sets of hash values. The step of comparing the selected hash value from each set may be performed separately for each hash function, and results of each of these steps of comparing may contribute to the score for each neighbor. The score indicates whether or not the node and the neighbor have a high degree of overlap. For example, if the selected hash values for the node and the neighbor match closely using many of several different hash functions, then the node and the neighbor likely have a high degree of overlap and, accordingly, a high score. Conversely, if the selected hash values for the node and the neighbor do not match using many of the several different hash functions, then the node and the neighbor likely have a low degree of overlap and, accordingly, a low score.

The graph partitioning module may select edges to neighbors of a given node for exclusion or removal based on the score or other indication about how closely related the neighbors of the given node are to the given node. Neighbors may be ranked, listed, organized, or ordered based on the score and optionally based on other factors. Edges to neighbors that are highly related may be kept, and edges to neighbors that are not highly related may be excluded or removed. For example, edges to neighbors that have more matching random values, such as values generating using the hashing technique described above, will be kept, and edges to neighbors that have fewer matching random values will be excluded or removed. In another example, edges to neighbors having a higher Jaccard Index (a lower Jaccard Distance) will be kept, and edges to neighbors having a lower Jaccard Index (a higher Jaccard Distance) will be excluded or removed.

Interface to the Graph Partitioning Module

The graph partitioning module may partition a graph into clusters in response to receiving a request that identifies the graph and/or clustering parameters for partitioning the graph. The clustering parameters may indicate how aggressively the graph partitioning module should remove edges, optionally with different levels of aggression for different iterations; a maximum cluster size, optionally with different maximum sizes for different iterations; and/or how many iterations of removing edges should be performed.

The request may be received as a function call to a special-purpose function that is invoked on computing device(s) to partition a graph into clusters. The request may be received as information that conforms to an application programming interface ("API") that allows applications to control the graph partitioning module using expected commands and/or parameters or a graphical user interface ("GUI") that allows users to control the graph partitioning module by providing input to a graphical display.

The request may be received as a message at a server that provides graph partitioning services and is configured to respond to requests with messages that indicate how graphs are partitioned. The graph partitioning module may also respond by storing information in a location expected by the requesting application, by storing a global variable accessible to an application or other requestor, or by passing or returning a variable to the application or other requestor. The stored information may include a mapping between each node of the graph and a corresponding cluster of a plurality of clusters to which the graph was partitioned. Alternatively, the stored information may include a new graph of the separated clusters as disconnected subgraphs.

Performing Cluster-Specific Actions

Once the graph partitioning module has partitioned nodes into defined clusters, further action may be taken with respect to the nodes on a cluster-specific basis. For example, different clusters may represent different communities of customers, and a marketing application running on computing device(s) may generate and/or send different marketing communications to different clusters based on characteristics of cluster members. Alternatively, demographic information may be collected on a cluster-specific basis, and marketing or advertising communications for a particular region may be customized for or selected based on the clusters that are most populous in that region.

As another example, the marketing application may identify a leading member of the cluster based on how well different members are connected to each other within the cluster or how well the different members are connected to members outside of the cluster. The leading member may be the most connected within and/or outside of the cluster, and the marketing application may generate and send marketing communications to the leading members of different clusters without generating or sending such communications to non-leading members of the different clusters. In yet another example, demographic information about the leading members but not non-leading members of clusters in a particular region may be collected and used to select or customize marketing or advertising communications for the particular region.

In one embodiment, the different clusters represent different groups of employees. A human resources application running on one or more computing devices may analyze the employee retention rates for different clusters and generate separate demographic information for clusters with lower retention rates and clusters with higher retention rates. The human resources application may also generate or initiate transmittal of information about potential benefits to employees in clusters with lower retention rates.

The different clusters may also be used to predict potentially different behaviors of different groups of people represented by the clusters. An application may compute statistics or demographic information for each of the different clusters. Cluster-specific trends may be determined based on logged activity of the different clusters, and these trends may be applied to predict behaviors of members of the respective clusters.

In yet another example, the nodes may represent Web pages or other articles of information or items of content, the edges may represent links, references, or identified overlapping content between the Web pages, and the different clusters may represent categories that may be content-related or source-related. An article in a cluster may be suggested to a user viewing another article in the cluster, or an article outside of the cluster may be suggested to a user that has expressed disinterest in an article in the cluster.

In yet another example, regardless of what the nodes represent, the cluster membership of the nodes may be used to determine which storage partition or which storage device should store information about the nodes. Information about nodes having common cluster membership may be stored on a same device or even in a same block of memory such that the information may be retrieved more efficiently when information is retrieved for multiple nodes in the cluster together. In another embodiment, a cache server that stores cached copies of data objects may determine which data objects to load based on which clusters are actively being requested from the cache server.

In another embodiment, cluster membership may be used to track affiliation, the spread of a disease, or the dissemination of information. A server may use the cluster membership information for a target or compromised node to determine a potentially compromised cluster, and the server may identify other members of the cluster that should be investigated for affiliation with the target node. For example, the server may use the cluster membership information to find members that belong to the immediate social network of a person who has contracted a contagious disease.

In yet another embodiment, a server may use the cluster membership information to determine which stocks or securities in the stock market are most closely related. The server may then suggest avoiding investing in multiple stocks that are closely related to each other, with a preference for a diversified portfolio. The server may also trigger alerts in the form of emails or text messages when other stocks or securities in a cluster have changed beyond a threshold amount, and when a user to be notified owns a stock or security in the cluster, whether that stock or security itself has changed beyond the threshold amount.

Cluster membership information may also be used to predict optimal hub locations for flight service based on flight history data or to identify people or machines that are related to frequently occurring problems in a factory.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
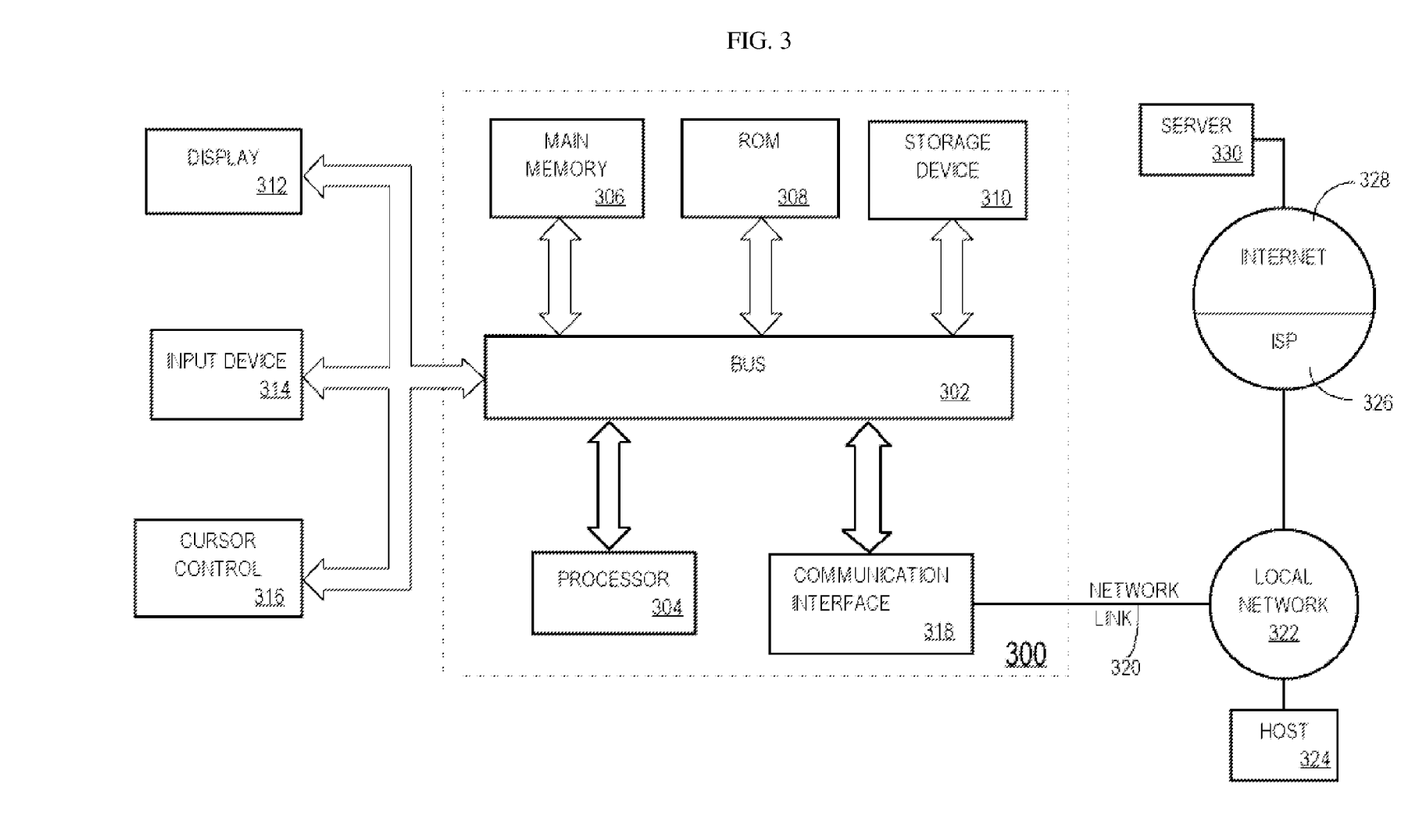
FIG. 3 illustrates an example computer system on which example embodiments described herein may be implemented. Although a single instance of the example computer system is depicted, multiple instances of the example computer system or of various elements thereof may function together to implement the example embodiments described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for partitioning a graph of nodes into a plurality of clusters, the method comprising:
    performing an edge removal iteration on the graph, wherein the edge removal iteration comprises, for each node of a plurality of nodes selected from the graph of nodes:
        determining, for each neighbor of said each node, a degree of overlap between neighbors of said each node and neighbors of said each neighbor of said each node; and
        removing one or more edges from the graph based on the degree of overlap between said neighbors of said each node and said neighbors of said each neighbor of each said node;
    after the edge removal iteration, determining whether any cluster of the graph is sufficiently partitioned;
    performing one or more additional edge removal iterations on the graph, wherein nodes that belong to clusters of the graph that are sufficiently partitioned are excluded from a plurality of remaining nodes, wherein the one or more additional edge removal iterations comprise, for each remaining node of the plurality of remaining nodes:
        determining, for each neighbor of said each remaining node, a degree of overlap between neighbors of said each remaining node and neighbors of said each neighbor of said each remaining node; and
        removing one or more additional edges from the graph based on the degree of overlap between said neighbors of said each remaining node and said neighbors of said each neighbor of said each remaining node;
    wherein the method is performed by one or more computing devices.

2. The method of claim 1, wherein performing the edge removal iteration on the graph includes, for said each node, determining how many edges to remove based at least in part on a total number of edges of said each node.

3. The method of claim 1,
    wherein performing the edge removal iteration on the graph includes, for said each node, determining how many edges to remove based at least in part on a first level of sparsification; and,
    wherein performing the one or more additional edge removal iteration on the graph includes, for said each remaining node, determining how many edges to remove based at least in part on a second level of sparsification;
    wherein the second level of sparsification causes removal of additional edges that were not removed based on the first level of sparsification.

4. The method of claim 1, wherein the degree of overlap between said neighbors of said each node and said neighbors of said each neighbor of said each node is determined at least in part by determining how many neighbors are shared by said each node and said each neighbor of said each node.

5. The method of claim 1, wherein the degree of overlap between said neighbors of said each node and said neighbors of said each neighbor of said each node is determined at least in part by:
    hashing identifiers of said neighbors of said each node into a first set of hash values and hashing identifiers of said neighbors of said each neighbor of said each node into a second set of hash values, and
    determining whether a first selected hash value of the first set of hash values for said each node matches a second selected hash value of the second set of hash values for said each neighbor of said each node.

6. The method of claim 5, further comprising
selecting a minimum hash value of the first set of hash values for said each node as the first selected hash value, and
selecting a minimum hash value of the second set of hash values for said each neighbor of said each node as the second selected hash value.

7. The method of claim 1, wherein said one or more additional edge removal iterations are performed until all the clusters of the plurality of clusters are sufficiently partitioned.

8. The method of claim 1, wherein said one or more additional edge removal iterations are stopped before exceeding a maximum number of iterations.

9. The method of claim 7, further comprising, for each of the one or more additional edge removal iterations, increasing a level of sparsification that is applied to determine how many edges to remove and a maximum cluster size for sufficiently partitioned clusters.

10. The method of claim 1, wherein determining whether any cluster of the graph is sufficiently partitioned comprises determining whether any disconnected cluster of the graph does not exceed a maximum cluster size.

11. The method of claim 1, further comprising:
receiving a request to partition the graph of nodes into the plurality of clusters; and
in response to the request, storing a mapping between each node in the graph and a corresponding cluster of the plurality of clusters.

12. The method of claim 1, wherein the plurality of nodes is less than all nodes in the graph.

13. The method of claim 1, wherein the edge removal iteration further comprises, for said each node, determining how many edges of said each node to keep.

14. The method of claim 1, further comprising storing information corresponding to nodes of the plurality of nodes that having a common cluster membership on a same storage device or a same storage partition.

15. The method of claim 1, further comprising analyzing a plurality of resulting clusters to predict potentially different behaviors of different groups represented by the plurality of resulting clusters.

16. The method of claim 1, wherein the nodes represent content items and the edges represent links, reference or identified overlapping content, further comprising suggesting a particular content item based on its membership in a resulting cluster.

17. One or more non-transitory computer-readable media storing one or more sequences of instructions for partitioning a graph of nodes into a plurality of clusters which, when executed, by one or more processors, cause:
performing an edge removal iteration on the graph, wherein the edge removal iteration comprises, for each node of a plurality of nodes selected from the graph of nodes:
determining, for each neighbor of said each node, a degree of overlap between neighbors of said each node and neighbors of said each neighbor of said each node; and
removing one or more edges from the graph based on the degree of overlap between said neighbors of said each node and said neighbors of said each neighbor of said each node;
after the edge removal iteration, determining whether any cluster of the graph is sufficiently partitioned;
performing one or more additional edge removal iterations on the graph, wherein nodes that belong to clusters of the graph that are sufficiently partitioned are excluded from a plurality of remaining nodes, wherein the one or more additional edge removal iterations, comprise, for each remaining node of the plurality of remaining nodes:
determining, for each neighbor of said each remaining node, a degree of overlap between, neighbors of said each remaining node and neighbors of said each neighbor of said each remaining node; and
removing one or more additional edges from the graph based on the degree of overlap between said neighbors of said each remaining node and said neighbors of said each neighbor of said each remaining node.

18. The one or more non-transitory computer-readable media of claim 17, wherein performing the edge removal iteration on the graph includes, for said each node, determining how many edges to remove based at least in part on a total number of edges of said each node.

19. The one or more non-transitory computer-readable media of claim 17,
wherein performing the edge removal iteration on the graph includes, for said each node, determining how many edges to remove based at least in part on a first level of sparsification; and,
wherein performing the one or more additional edge removal iteration on the graph includes, for said each remaining node, determining how many edges to remove based at least in part on a second level of sparsification;
wherein the second level of sparsification causes removal of additional edges that were not removed based on the first level of sparsification.

20. The one or more non-transitory computer-readable media of claim 17, wherein the degree of overlap between said neighbors of said each node and said neighbors of said each neighbor of said each node is determined at least in part by determining how many neighbors are shared by said each node and said each neighbor of said each node.

21. The one or more non-transitory computer-readable media of claim 17, wherein the one or more sequences of instructions include instructions that, when executed, cause:
determining the degree of overlap between said neighbors of said each node and said neighbors of said each neighbor of said each node at least in part by:
hashing identifiers of said neighbors of said each node into a first set of hash values and hashing identifiers of said neighbors of said each neighbor of said each node into a second set of hash values, and
determining whether a first selected hash value of the first set of hash values for said each node matches a second selected hash value of the second set of hash values for said each neighbor of said each node.

22. The one or more non-transitory computer-readable media of claim 21, wherein the one or more sequences of instructions include instructions that, when executed, cause selecting a minimum hash value of the first set of hash values for said each node as the first selected hash value, and selecting a minimum hash value of the second set of hash values for said each neighbor of said each node as the second selected hash value.

23. The one or more non-transitory computer-readable media of claim 17, wherein said one or more additional edge removal iterations are performed until all the clusters of the plurality of clusters are sufficiently partitioned.

24. The one or more non-transitory computer-readable media of claim 23, wherein the one or more sequences of instructions include instructions that, when executed, cause, for each of the one or more additional edge removal iterations, increasing a level of sparsification that is applied to determine how many edges to remove and a maximum cluster size for sufficiently partitioned clusters.

25. The one or more non-transitory computer-readable media of claim 17, wherein said one or more additional edge removal iterations are stopped before exceeding a maximum number of iterations.

26. The one or more non-transitory computer-readable media of claim 17, wherein determining whether any cluster of the graph is sufficiently partitioned comprises determining whether any disconnected cluster of the graph does not exceed a maximum cluster size.

27. The one or more non-transitory computer-readable media of claim 17, wherein the one or more sequences of instructions include instructions that, when executed, cause:
    receiving a request to partition the graph of nodes into the plurality of clusters; and
    in response to the request, storing a resulting graph that indicates the plurality of clusters.

28. The one or more non-transitory computer-readable media of claim 17, wherein the plurality of nodes is less than all nodes in the graph.

29. The one or more non-transitory computer-readable media of claim 17, wherein the edge removal iteration further comprises, for said each node, determining how many edges of said each node to keep.

30. The one or more non-transitory computer-readable media of claim 17, wherein the one or more sequences of instructions include instructions that, when executed, cause:
    storing information corresponding to nodes of the plurality of nodes that having a common cluster membership on a same storage device or a same storage partition.

31. The one or more non-transitory computer-readable media of claim 17, wherein the one or more sequences of instructions include instructions that, when executed, cause:
    analyzing a plurality of resulting clusters to predict potentially different behaviors of different groups represented by the plurality of resulting clusters.

32. The one or more non-transitory computer-readable media of claim 17,
    wherein the nodes represent content items and the edges represent links, reference or identified overlapping content,
    wherein the one or more sequences of instructions include instructions that, when executed, cause suggesting a particular content item based on its membership in a resulting cluster.

* * * * *

UNITED STATES PATENT AND TRADEMARK OFFICE
CERTIFICATE OF CORRECTION

PATENT NO.         : 9,208,257 B2                                  Page 1 of 1
APPLICATION NO.    : 13/832806
DATED              : December 8, 2015
INVENTOR(S)        : Milenova et al.

It is certified that error appears in the above-identified patent and that said Letters Patent is hereby corrected as shown below:

On the title page, item 56

On page 2, column 2, under Other Publications, line 16, delete "Compter" and insert -- Computer --, therefor.

In the specification

In column 8, line 5, delete "f(d,x)=d (1-log(x))" and insert -- f(d,x)=d(1-log(x)) --, therefor.

In the claims

In column 14, line 14-15, in claim 1, delete "each said" and insert -- said each --, therefor.

In column 15, line 50, in claim 17, delete "executed," and insert -- executed --, therefor.

In column 16, line 2, in claim 17, delete "iterations," and insert -- iterations --, therefor.

Signed and Sealed this
Twenty-third Day of August, 2016

Michelle K. Lee
*Director of the United States Patent and Trademark Office*